UNITED STATES PATENT OFFICE.

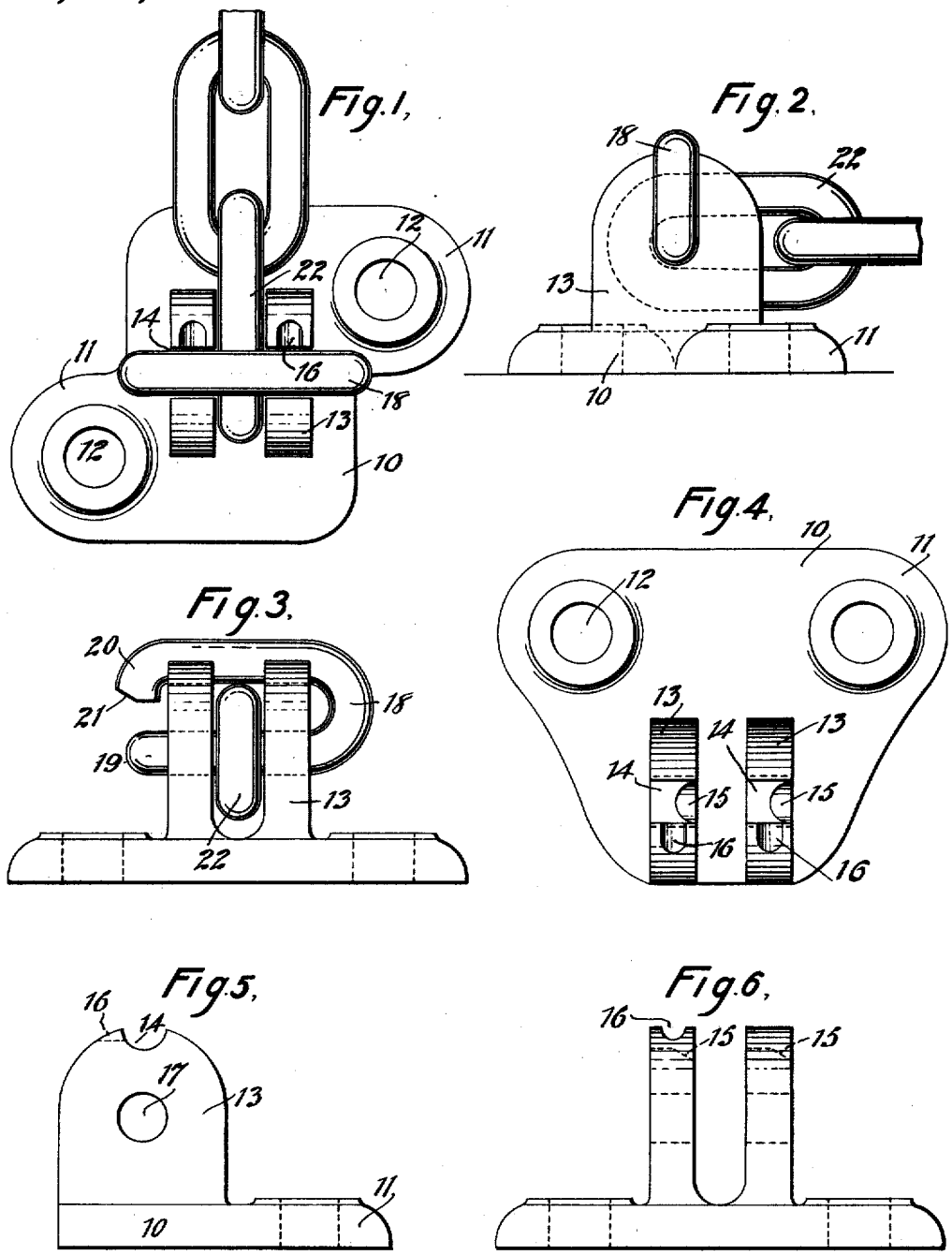

REUBEN HARRISON BACHMAN AND FRANK H. BACHMAN, OF ALLENTOWN, PENNSYLVANIA.

FASTENING DEVICE.

1,313,049.     Specification of Letters Patent.     Patented Aug. 12, 1919.

Application filed February 14, 1919. Serial No. 276,930.

*To all whom it may concern:*

Be it known that we, REUBEN H. BACHMAN and FRANK H. BACHMAN, both citizens of the United States, and residents of Allentown, in the county of Lehigh and State of Pennsylvania, have invented a new and Improved Fastening Device, of which the following is a full, clear, and exact description.

The present invention relates to new and useful improvements in fastening devices for chains, and while it is primarily intended for this purpose the device is capable of use in other connections as well.

The primary object of the invention is to provide a fastening device for chains to which a chain may be readily attached or from which it may readily be detached.

A further object of the invention is to provide means for maintaining a chain in engagement with the device at all times.

A still further object of the invention is to provide suitable means by which the chain-securing device is maintained in position against accidental displacement.

With the above and other objects in view which will appear as the description of the invention proceeds, reference is had to the accompanying drawings in which—

Figure 1 is a top plan view of one form of the device;

Fig. 2 is a view in side elevation of the form shown in Fig. 1;

Fig. 3 is an end view of a slightly modified form of the invention;

Fig. 4 is a top plan view of the form shown in Fig. 3;

Fig. 5 is a side elevation of the form shown in Fig. 3, and

Fig. 6 is an end view thereof.

Referring more particularly to the drawings, the device comprises a substantially rectangular base member 10, having on opposite sides thereof, lugs or ears 11, provided with perforations 12, by means of which the base member may be secured to any suitable support, bolts or lag screws being passed through the perforations 12 for this purpose.

Projecting vertically from the top face of the base member 10, are two spaced wings 13, the upper end of each of which is preferably rounded as shown in Fig. 2. Extending transversely of the upper end of each of these wings is a groove 14, the grooves 14 being arranged in alinement with each other. As shown in Figs. 4 and 6, one end of each of the grooves is formed to provide a downward incline or bevel 15. Extending into the side of each of the grooves 14, is a groove 16, the purpose of which will be hereinafter described.

The wings 13 are provided with alined perforations 17, which are preferably arranged centrally thereof as shown in Fig. 5. Adapted to pass into the perforations 17 in the wings 13, is a spring link 18, which is substantially U-shape in form, and has one of its legs rounded as at 19, to facilitate its insertion into and through the perforations 17. The opposite leg of this U-shaped member 18 is curved downwardly as at 20, at its free end. Said downwardly-curved end is provided with an inclined face 21.

In operation, a link 22 of a length of chain is inserted between the spaced wings 13, and when the said link is thus positioned, the leg 19 of the U-shaped member is passed through the perforations 17 and through the link 22. In carrying out this operation, the inclined wall or face 21 of the leg 20 of the U-shaped member engages the angular face or bevel 15 of the right-hand wing 13, and upon submitting the U-shaped member to the driving action of a hammer or the like, the same is caused to spread permitting of its movement transversely of the wings 13, until the angular wall 21 thereof engages the angular face 15 of the left-hand wing 13, when the U-shaped member 18 is again submitted to the spreading action which will permit the end 20 thereof to pass to the position shown in Fig. 3.

By this construction, it will be seen that the tension under which the U-shaped member 18 is placed in properly positioning the same, serves together with the downwardly-curved end 20 of one of its legs, to prevent accidental displacement of the leg 19 from the perforations 17, thus insuring proper engagement of the parts at all times.

If it be desired to remove the U-shaped member 18, a suitable tool is passed beneath its upper leg, which operation is permitted by reason of the grooves 16 extending transversely into the groove 14. As hereinbefore described, the upper leg is sprung upwardly and the member 18 forced from its operative position.

Having thus described the invention, what is claimed is—

1. A device of the class described comprising a base, a pair of spaced perforated lugs projecting from said base, means passing through said perforations for securing a link of chain between the lugs, and means engaging the free ends of said lugs for retaining the link-securing means in place.

2. In a device of the class described, in combination, a base having a fixed member, and a removable element adapted to secure a link of chain with respect to said fixed member, said removable element comprising resiliently connected parts, one of said parts serving to engage said fixed member, and the link of the chain, the other of said parts serving to hold said removable element against displacement from said fixed member when in operative position.

3. A device of the class described comprising a base having means for attachment to a support, said base being provided with spaced wings having alined perforations and alined grooves, said alined grooves and said alined perforations being substantially parallel, said grooves at corresponding ends being provided with bevels, and a removable element consisting of a U-shaped member, one part of which is adapted to enter said perforations to secure a link of chain between said wings, the other part of said member having its free end downwardly curved and beveled and being adapted to seat in said alined grooves when said removable element is in operative position, said bevels of said grooves and said bevel at the free end of said member coöperating to permit said member to be forced into operative position, said wings being cut away to permit the insertion of a tool into said grooves to permit of the removal of said removable element.

4. A chain end attaching device comprising a base, a pair of spaced integral lugs projecting from said base and provided with alined perforations, and a substantially U-shaped resilient member adapted to have one of its legs passed through said alined openings to retain the chain between said spaced lugs, the other leg of said U-shaped member engaging said lugs to prevent displacement of said U-shaped member.

REUBEN HARRISON BACHMAN.
FRANK H. BACHMAN.

Copies of this patent may be obtained for five cents each, by addressing the "Commissioner of Patents, Washington, D. C."